Patented Aug. 7, 1945

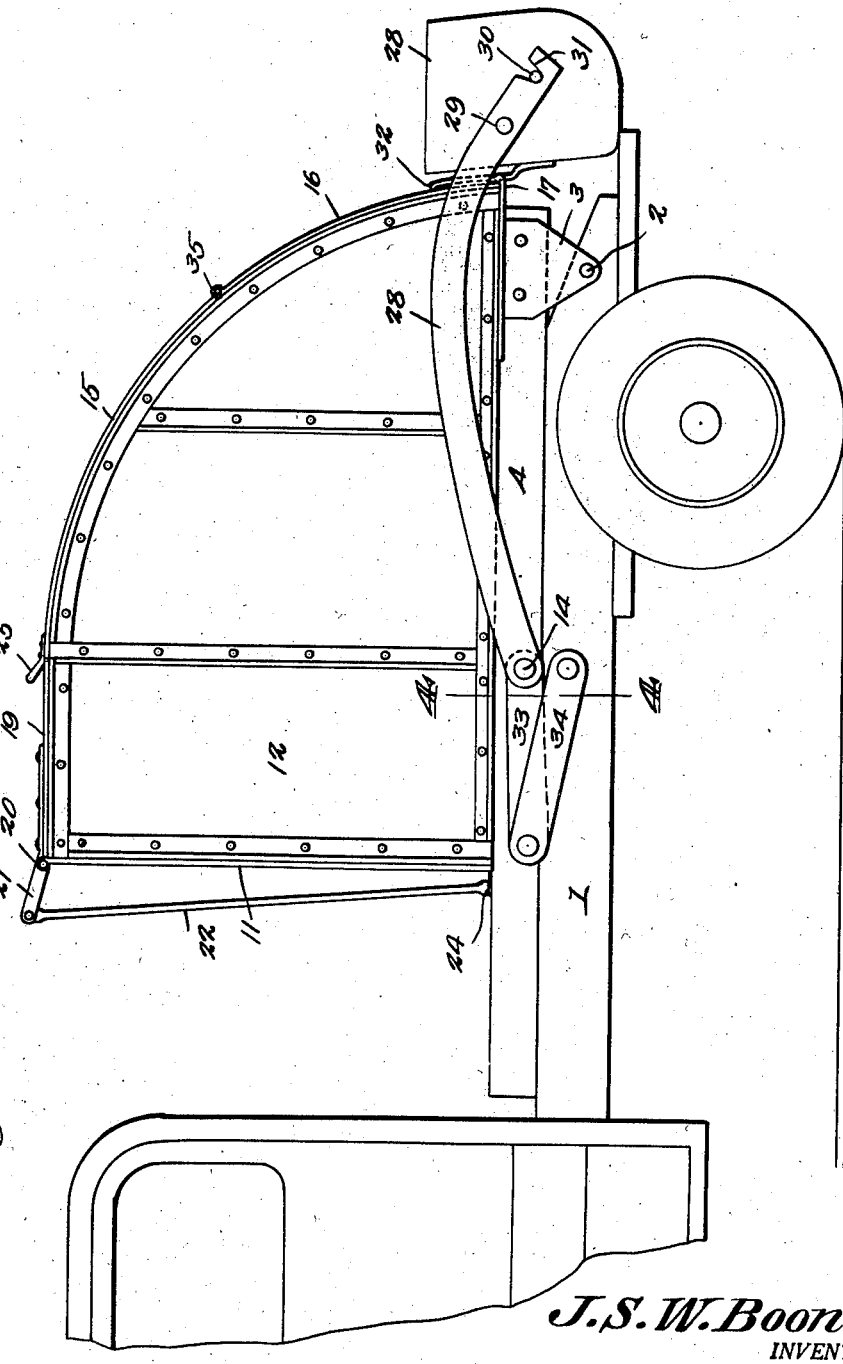

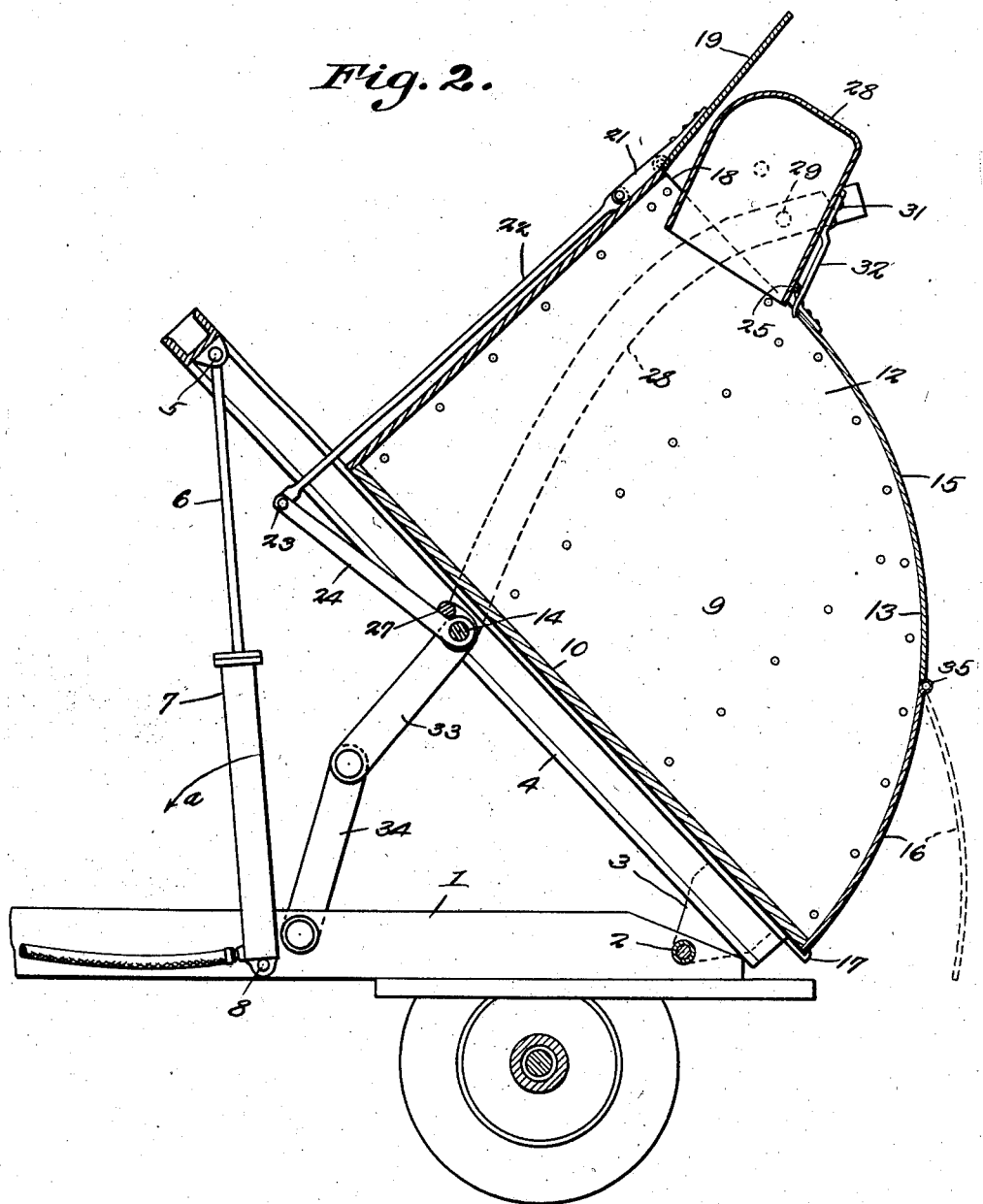

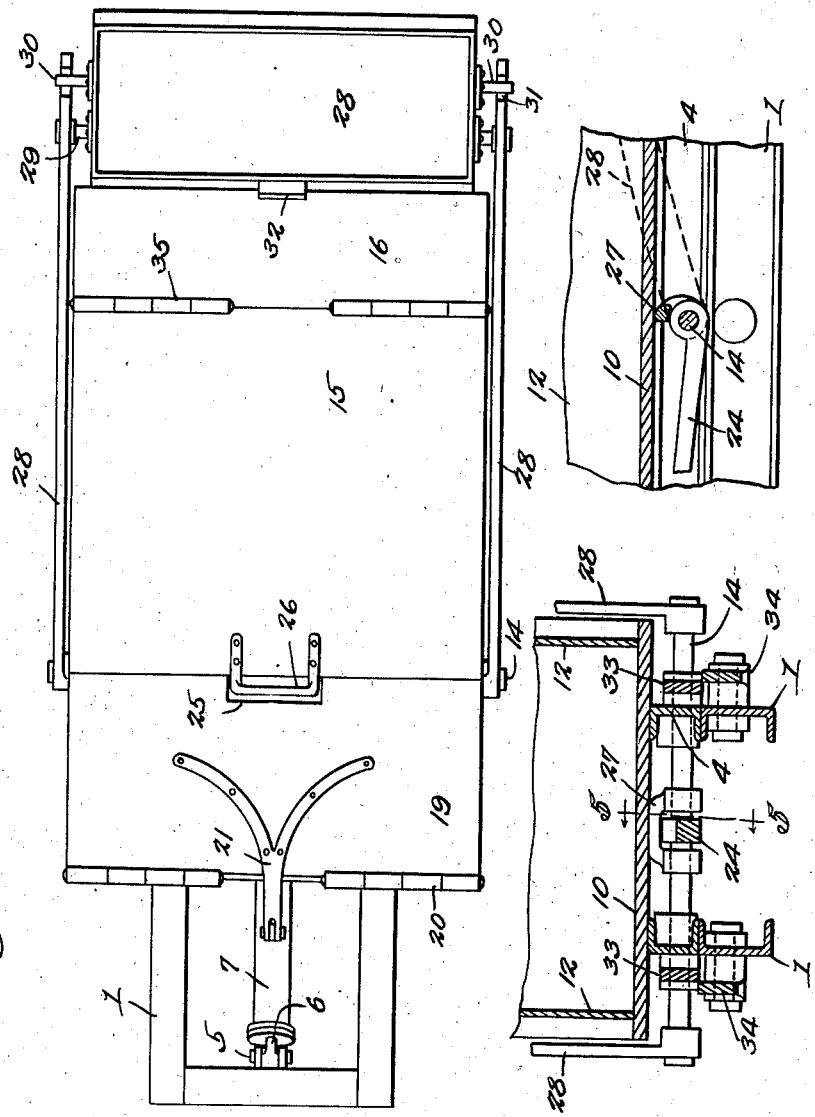

2,380,917

UNITED STATES PATENT OFFICE 2,380,917

SELF-LOADING TRUCK BODY

John S. W. Boone, Chapel Hill, N. C.

Application April 19, 1944, Serial No. 531,799

4 Claims. (Cl. 214—67)

This invention relates to a self-loading truck body and while it is designed primarily for depositing garbage in the body, it obviously could be used for handling other kinds of material.

An object of the invention is to provide a truck of this character requiring very few working parts, is light in construction and requires but a single hoisting means both for tilting the body relative to its supporting chassis and for directing material into the body.

A still further object is to provide a self-loading truck body which does not require the use of cables, pulleys, chains, etc., which have heretofore complicated structures of this character and, because of its reduction in weight and cost, will be found more desirable than other structures of a like nature heretofore devised.

With the foregoing and other objects in view which will appear as the description proceeds, the invention consists of a certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings

Figure 1 is a side elevation of a portion of a truck showing the present improvements combined therewith, the body and other working parts being shown in their normal positions.

Figure 2 is a vertical longitudinal section through the body and adjacent parts, said body being shown in tilted position for either loading or dumping.

Figure 3 is a top plan view of the body and a portion of the chassis with the parts in their normal positions.

Figure 4 is a section on line 4—4, Figure 1.

Figure 5 is a section on line 5—5, Figure 4.

Referring to the figures by characters of reference, 1 designates a portion of the chassis of a truck having a transverse shaft 2 which constitutes a pivotal connection between the chassis and brackets 3. These brackets are fixedly secured to the sides of the bottom frame 4 of the truck body so that said frame thus is free to swing upwardly and downwardly relative to the chassis. Brackets 3 are located close to the rear or dumping end of the tiltable structure while the other end of said structure is pivotally engaged at 5 by the plunger 6 of the hydraulic lift 7 pivotally mounted at 8 within the chassis 1 and actuated by any suitable means. When this lift is operated under pressure, the frame 4 can be caused to swing upwardly as shown in Figure 2 and when pressure is removed the said frame can swing downwardly to substantially horizontal position. The pivotal connections 5 and 8 are so located that when frame 4 is in its lowermost position on the chassis 1, the hydraulic lift will be housed between them after swinging downwardly in the direction indicated by the arrow $a$ in Figure 2.

The body of the structure has been indicated at 9 and includes a bottom 10 secured on frame 4 and a front wall 11 upstanding from the bottom. The side walls 12 can be provided with top edge portions 13 concentric with a shaft 14 journalled in the frame 4 and extending transversely thereof. An arcuate plate 15 is secured on the arcuate edges 13, there being an arcuate door 16 hingedly connected to the lower edge of the plate 15 and constituting a continuation of said plate so that when the door 16 is closed, it will abut against the side walls 12 and also against the rear edge of the bottom 10. Suitable holding means such as spring latches 17 can engage the lower edge of the door 16 for the purpose of holding it normally closed. The door can be released simply by depressing the latches 17. Obviously other holding means for the door could be used.

The upper or rear edge of the arcuate top plate 15 is spaced from the top edge of the wall 11 so as to provide an inlet opening 18. A lid 19 is hingedly connected to the upper edge of the wall 11 as shown at 20 and has an arm 21 fixedly secured thereto and extended forwardly therefrom. To this arm is pivotally connected a rod 22 extended downwardly and pivotally joined at 23 to one end of an arm 24 the other end of which is mounted on but is adapted to turn relative to the shaft 14. The parts are so proportioned that when the body 9 is in its normal or lowermost position, the lid 19 will be closed against the walls 12 as clearly indicated in Figure 1. It will be noted that that end of the lid 19 remote from the arm 21 has an opening 25 so that the lid can move past a bracket 26 in the form of an inclined loop which is secured to the upper edge portion of the plate 15 and extends slightly over the opening 18.

Secured to the shaft 14 so as to rotate therewith is a tripping member 27 preferably in the form of a loop which bridges the arm 24 as shown particularly in Figure 4. Normally this tripping member 27 is spaced from the arm as shown in Figure 5, but following a predetermined relative movement of the shaft 14 and frame 4, the tripping member 27 will engage arm 24 as in Figure 2 for the purpose hereinafter explained.

Secured to the ends of shaft 14 so as to rotate therewith are sweeps 28 arranged outside of but close to the body and proportioned to extend beyond the back end thereof. Located between these sweeps is a loading bucket 28 provided with gudgeons 29 which are rotatably mounted in the sweep. Supporting pins 30 are also extended from the sides of the bucket and are adapted to rest within notches 31 located in the top edges of the sweeps adjacent their rear ends. These parts are so located that, when the body 9 is in its lowermost position, as in Figure 1, the gudgeons and the supporting pins will hold the bucket across the lower portion of the back of the body where it can be filled readily by attendants. The bucket is provided between its ends with an upwardly extending tongue 32 projecting from that wall thereof nearest to the body. It will be noted that the gudgeons 29 and the pins 30 are located at opposite sides of the center of gravity of the bucket so that they cooperate normally to hold the bucket from tilting relative to the sweeps supporting it.

Fixedly secured to the end portions of the shaft 14 are arms 33 and these arms are connected to the sides of the chassis 1 by links 34. The links and arms are so proportioned that when the body is in lowered position, as in Figure 1, they are folded as indicated in Figure 1.

Normally the lid 19 and the door 16 are closed and the bucket is located where it can be reached readily. As garbage or other material is collected, it is deposited in this bucket the top of which is open. By means of the hoist 6—7 the body is then swung upwardly to the position shown in Figure 2. As this action takes place, the bucket is carried by the sweeps along the arcuate plate 15 until the tongue 32 becomes engaged with the tripping loop 25 whereupon continued upward movement of the bucket results in swinging it to an inverted position so that its contents will fall therefrom into the body. Before the bucket reaches this position, however, the tripping loop 27 comes against arm 24 and thrusts it downwardly a short distance relative to the bottom 10 so that rod 22 thus pulls on arm 21 and swings the lid 19 upwardly to open position. After the bucket has been emptied as described, the frame 4 is lowered by releasing pressure upon the hoist and the parts all return to their normal positions by gravity whereupon the operation can be repeated.

When the contents of the body are to be dumped therefrom, the body is again raised to the position shown in Figure 2 after which the gate or lid 16 is opened and the contents can then slide from the body.

It will be noted that the tongue 3 constitutes a runner for holding the upper portion of the bucket normally spaced from the arcuate top of the body, this runner being located where it will travel between the spaced hinges 35 which connect the door 16 to the top 15.

What is claimed is:

1. The combination with a truck chassis, of a body thereon mounted for tilting movement, there being an inlet opening in the top of the body adjacent to one end, a lid normally closing the opening, sweeps joined to the body and positioned for movement at the sides thereof, a bucket pivotally mounted between the sweeps and normally positioned adjacent to the bottom of the back end of the body, means for tilting the body relative to the chassis, means operated by the tilting of the body for actuating the sweep to convey the bucket to a point adjacent to and above the opening, and delayed action means controlled by the tilting of the body for moving the lid to open position when the bucket arrives adjacent to the opening.

2. The combination with a truck chassis, of a body mounted thereon and tiltably joined thereto at its back end portion, said body having an arcuate top leading upwardly from its back end portion to the front of the body, there being an inlet opening in the top adjacent to the front thereof, a closure for the inlet opening, sweeps movable with the body and mounted to swing relative thereto, a bucket pivotally supported by and between the sweeps, means for tilting the body relative to the chassis, lost motion means controlled by the tilting of the body for moving the closure to open position when the body is tilted upwardly relative to the chassis, and means controlled by said movement of the body for actuating the sweeps, thereby to convey the bucket to the inlet opening.

3. The combination with a truck chassis, of a body mounted thereon and tiltably joined thereto at its back end portion, said body having an arcuate top leading upwardly from its back end portion to the front of the body, there being an inlet opening in the top adjacent to the front thereof, a closure for the inlet opening, sweeps movable with the body and mounted to swing relative thereto, a bucket pivotally supported by and between the sweeps, means for tilting the body relative to the chassis, lost motion means controlled by the tilting of the body for moving the closure to open position when the body is tilted upwardly relative to the chassis, means controlled by said movement of the body for actuating the sweeps, thereby to convey the bucket to the inlet opening, and cooperating means on the top of the body and on the bucket for inverting the bucket over the inlet opening during the last portion of the movement of the sweeps in one direction during the tilting of the body.

4. The combination with a truck chassis, a dump body having a closed arcuate top extending along curved lines to the rear end of the bottom of the body, said top having an inlet opening at its forward end, and a pivotal connection between the rear portion of the body and the chassis, of a transverse shaft rotatably mounted in the chassis, sweeps connected to the shaft and movable along opposite sides of the body, a bucket tiltably mounted between the sweeps and movable along the arcuate top of the body, said bucket being normally positioned by gravity adjacent to the lower portion of the back end of the body, a lever in which the shaft is mounted to turn, a closure hingedly connected to the body and normally positioned in closed position across the opening, means actuated by said lever when moved in one direction, for shifting the closure to open position, a tripping element movable with the sweeps and normally spaced from the lever, said element being positioned to engage and actuate the lever when the sweeps and the bucket are brought to a predetermined position, means for tilting the body relative to the chassis, and means actuated by the tilting of the body for rotating the shaft and swinging the sweeps.

JOHN S. W. BOONE.